(12) United States Patent
Erickson et al.

(10) Patent No.: US 8,151,673 B2
(45) Date of Patent: Apr. 10, 2012

(54) OFF-AXIS SPRING HELD CLAMPING UNIT

(75) Inventors: Robert Alfred Erickson, Raleigh, NC (US); Carla Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 406 days.

(21) Appl. No.: 12/565,158

(22) Filed: Sep. 23, 2009

(65) Prior Publication Data

US 2011/0067536 A1 Mar. 24, 2011

(51) Int. Cl.
*B23B 29/00* (2006.01)
*B23C 5/26* (2006.01)

(52) U.S. Cl. .......................... 82/160; 82/158

(58) Field of Classification Search .............. 82/158, 82/159, 160, 155, 152; 409/234; 408/239 R
See application file for complete search history.

(56) References Cited

U.S. PATENT DOCUMENTS

| | | | |
|---|---|---|---|
| 3,533,312 A * | 10/1970 | McCreery | 408/241 R |
| 4,680,999 A | 7/1987 | Kojima et al. | |
| 4,747,735 A | 5/1988 | Erickson et al. | |
| 4,843,929 A | 7/1989 | Andersson | |
| 4,981,057 A | 1/1991 | von Haas et al. | |
| 5,040,932 A | 8/1991 | Oshnock | |
| 5,054,344 A * | 10/1991 | Erickson et al. | 82/160 |
| 5,090,280 A * | 2/1992 | Kosker | 82/158 |
| 5,173,017 A | 12/1992 | Oshnock et al. | |
| 5,245,896 A | 9/1993 | Erickson et al. | |
| 5,341,710 A | 8/1994 | Peuterbaugh | |
| 5,415,066 A * | 5/1995 | Erickson et al. | 82/160 |
| 5,466,102 A * | 11/1995 | Erickson | 409/232 |
| 5,694,820 A | 12/1997 | Erickson et al. | |
| 6,543,318 B1 * | 4/2003 | Erickson | 82/1.11 |
| 8,066,455 B2 * | 11/2011 | Neumann et al. | 409/234 |

FOREIGN PATENT DOCUMENTS

DE 3344467 C2 6/1985

* cited by examiner

*Primary Examiner* — Will Fridie, Jr.
(74) *Attorney, Agent, or Firm* — Larry R. Meenan

(57) ABSTRACT

A clamping device used for securing a toolholder for metal working operations includes a lock rod reciprocating along a lock rod longitudinal axis to radially activate locking balls to engage perforations within the shank of a toolholder, wherein the toolholder is oriented along a toolholder axis non parallel to the locking rod longitudinal axis. Additionally, the lock rod includes a ramp which engages a bump-off pin in a direction lateral to the motion of the lock rod to provide a mechanism for ejecting the toolholder from the clamping device.

21 Claims, 7 Drawing Sheets

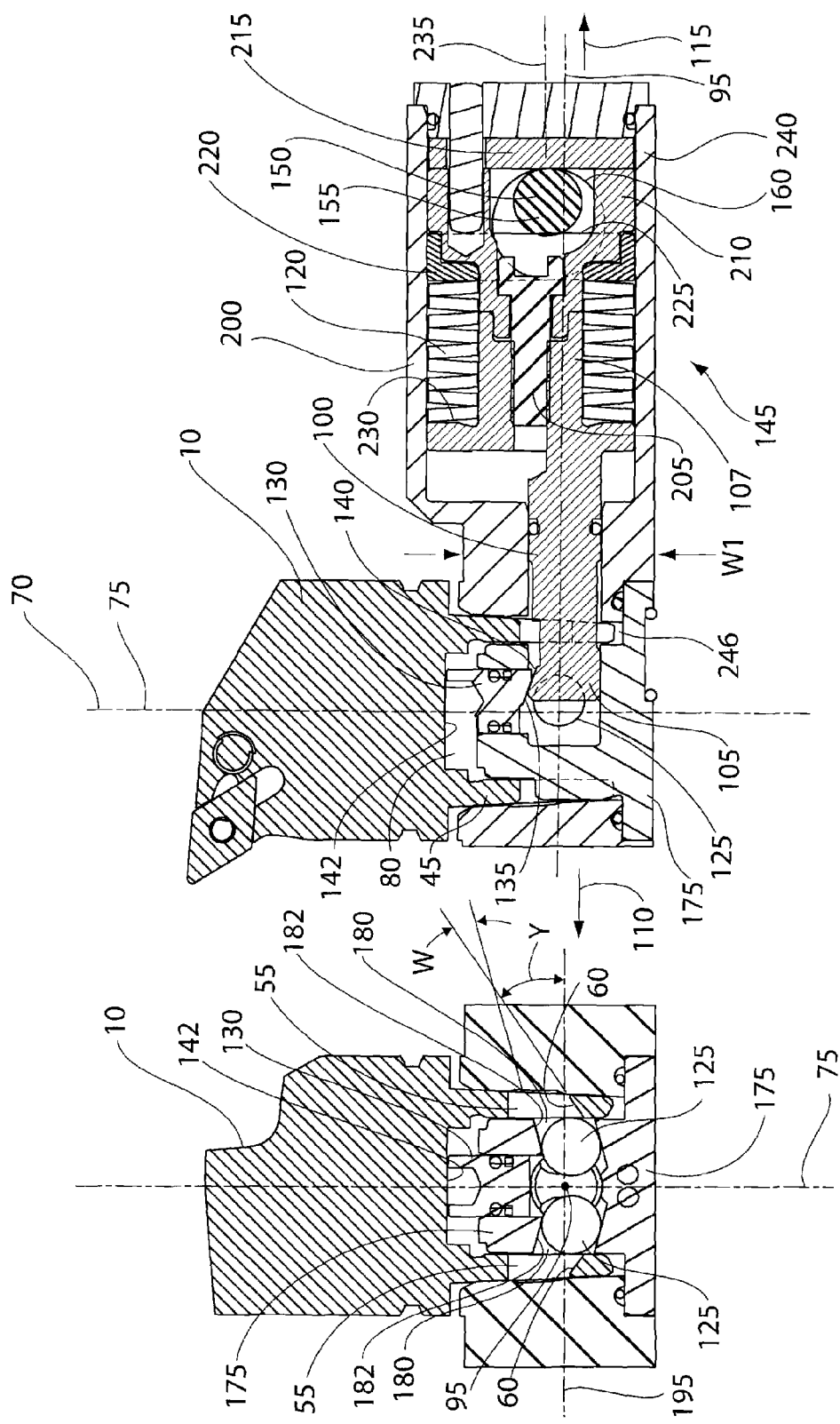

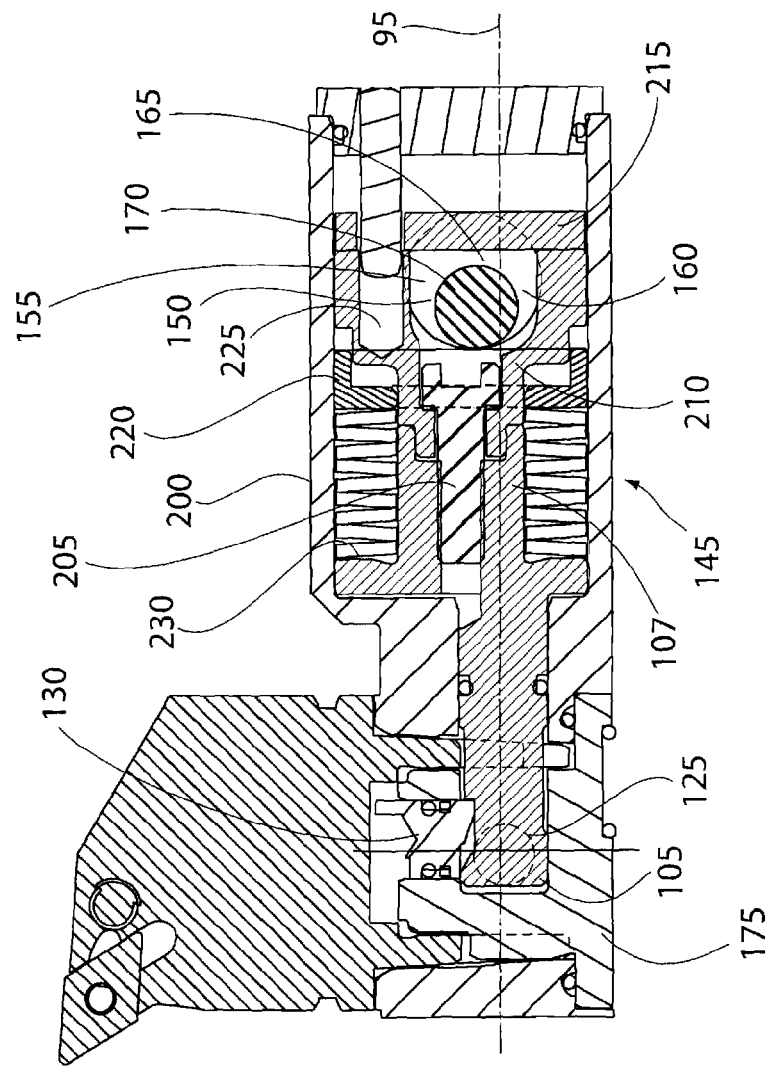

OFF-AXIS SPRING HELD CLAMPING UNIT

BACKGROUND OF THE INVENTION

1. Field of the Invention

The present invention relates to an apparatus for securing a toolholder within a clamping unit and, more specifically, relates to the use of a clamping unit activated by the motion of a longitudinally movable spring loaded lock rod to secure a toolholder within the base member, wherein the toolholder is secured along an axis different from that of the lock rod longitudinal axis.

2. Description of the Related Art

As an overview, metal working operations are typically performed using a cutting insert of a hard metal. Such an insert is mounted to a toolholder. The toolholder is secured either temporarily or permanently to a base member which is part of a machine such as a lathe or a milling machine.

Because of the extreme conditions under which they operate, cutting inserts must be replaced on a regular basis. In order to do this, the cutting insert must be removed from the toolholder. The economies of the metal working operation make it inefficient to shut a machine down for the length of time required to replace a cutting insert on a toolholder. It is more desirable to utilize a removable toolholder such that the entire toolholder with the accompanying cutting insert may be removed and replaced with another toolholder having a new cutting insert already in position on the toolholder.

With this in mind, the focus for efficiency becomes the ease and speed with which the toolholder may be replaced. This has been one of the motivating factors producing different commercial designs for quick change toolholders.

One example of such a design may be found in U.S. Pat. No. 4,747,735 entitled "Toolholder and Method of Releasably Mounting" by Erickson, et al., which is assigned to the Applicants of the subject invention and which is hereby incorporated by reference. This reference teaches a spring loaded reciprocating lock rod which is urged rearwardly by the springs to move locking members radially outwardly to secure a toolholder within a toolholder support member. In order to release the toolholder, the lock rod must be advanced so that the locking members are retracted and, furthermore, so that the toolholder is bumped from the toolholder support member. However, the locking member described in this patent must be activated axially and it is not capable of side activation.

U.S. Pat. No. 5,415,066 entitled "Apparatus for Holding a Toolholder Shank" by Erickson, et al., which is assigned to the Applicant of the subject invention and which is hereby incorporated by reference, discloses a side activation quick-change mechanism having a spring loaded longitudinally movable lock rod within a toolholder receiving member used to accept and secure therein a toolholder along the same longitudinal axis as that of the lock rod.

However, in an effort to conserve space, the inventors have realized that this parallel clamping system, wherein the toolholder extends from the toolholder receiving member along the longitudinal axis, could be reduced in length if the toolholder were to be mounted upon the side of the toolholder receiving member. This becomes an important factor on a machine which mounts clamping mechanisms on the periphery of its turret.

BRIEF SUMMARY OF THE INVENTION

In one embodiment of the subject invention, a clamping unit for releasably holding a tubular toolholder shank has a base member with a base member longitudinal axis extending therethrough, a laterally facing abutment surface, and a shank bore intersecting with and extending inwardly from the laterally facing surface for receiving the toolholder shank. The shank bore has a shank bore axis that is non-parallel to the base member longitudinal axis. The clamping unit also includes a lock rod with a forward end and a rearward end within the base member movable along the base member longitudinal axis in a forward and rearward reciprocating motion for securing the toolholder shank within the bore to a locked position and for releasing the toolholder shank from the bore to an unlocked position. At least one spring within the clamping unit is biased to urge the lock rod into the locked position.

In another embodiment of the subject invention, a clamping unit for detachably connecting a toolholder to a base member is comprised of a base member with a base member longitudinal axis extending therethrough, a laterally facing abutment surface, and a shank bore intersecting with and extending inwardly from the laterally facing surface for receiving the toolholder shank. The shank bore has a shank bore axis that is non-parallel to the base member longitudinal axis. The clamping unit includes at least one locking ball and a canister member that is mateable with a toolholder and which includes an aperture for admitting the locking ball. A lock rod that is reciprocally movable along a longitudinal axis and including a depression for receiving the locking element in an unlocked position and a ramp on one side of the depression for moving the locking element radially with respect to the axis through the canister aperture from an unlocked position into locking engagement with a wall of the toolholder.

BRIEF DESCRIPTION OF THE DRAWINGS

FIG. 2 is a sectional view of the clamping unit illustrated in FIG. 1, along lines "2-2", however, with the toolholder partially mounted within the clamping device;

FIG. 3 is a sectional view along lines "3-3" in FIG. 2;

FIG. 4 is a sectional view along lines "4-4" in FIG. 1, however, with the toolholder in the locked position within the clamping device;

FIG. 5 is a sectional view along lines "5-5" in FIG. 4;

DETAILED DESCRIPTION OF THE INVENTION

Figure 1:
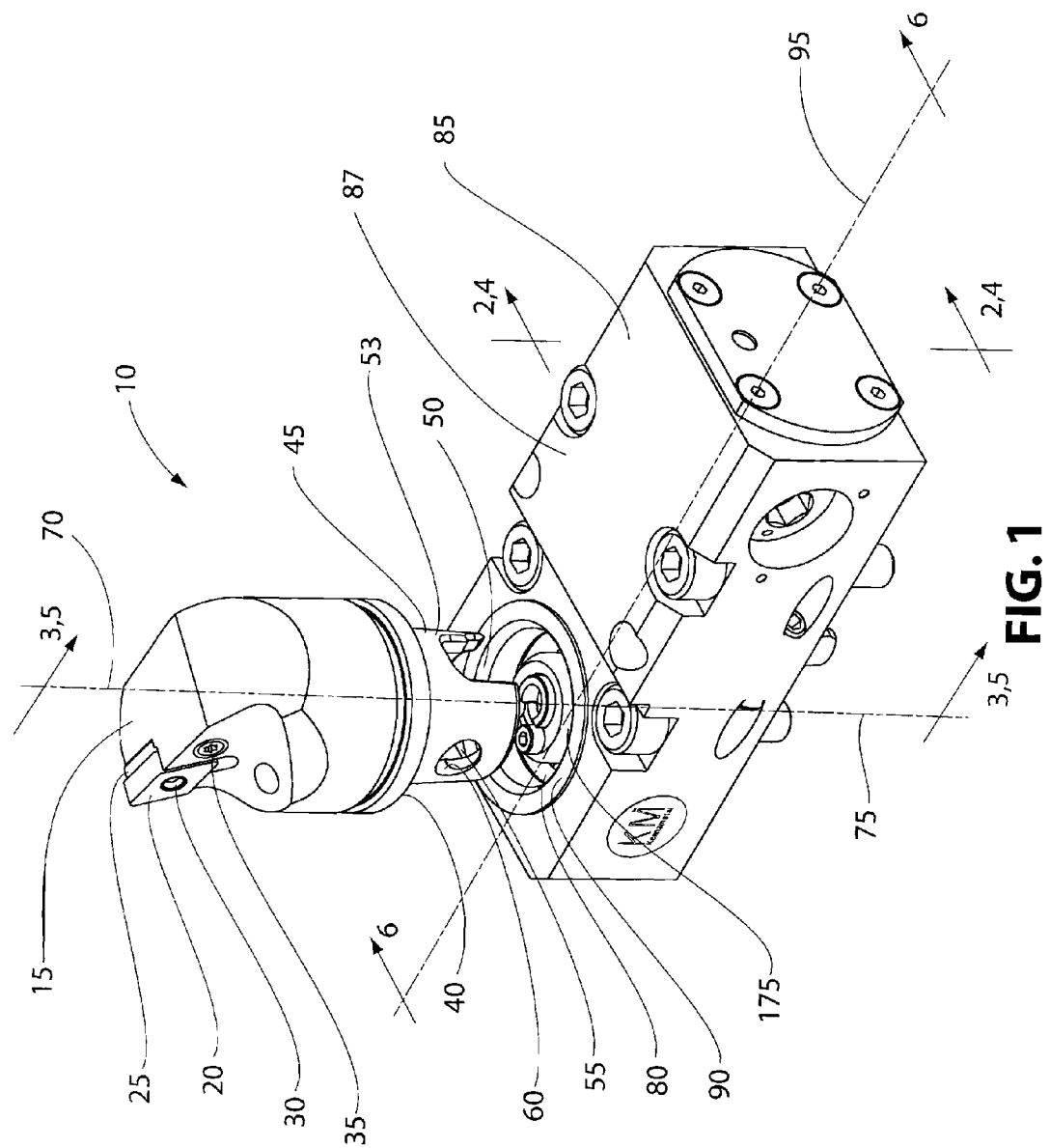
FIG. 1 is a perspective view of the clamping unit with a toolholder aligned to be inserted.

FIG. 1 shows a toolholder 10 having a forward end 15 upon which a cutting insert 20 is mounted. The cutting insert 20 may be spaced within the toolholder by a shim 25, and both the cutting insert 20 and the shim 25 are held to the toolholder 10 by means such as a locking pin 30 operated by a lever controlling screw 35. The toolholder 10 has a rearwardly facing abutment face 40 with a tubular shank 45 extending rearwardly away from the forward end 15. The toolholder may have an alignment slot 50 within the shank wall 53 and spaced perforations 55. The toolholder 10 may have forwardly facing concave contact surfaces 60 within the perforations 55. The toolholder 10 is positioned about a toolholder longitudinal axis 70. The toolholder longitudinal axis 70, as will be discussed, is co-axial with the longitudinal axis 75 of the bore 80 to accept the toolholder 10 within the clamping unit 85. Additionally, the clamping unit 85 has a laterally facing abutment surface 90.

The toolholder shown in FIG. 1 is typical of a toolholder used for non-rotating toolings, such as a lathe. However, it should be understood that the toolholder may have attached to it any one of a variety of tools that may be associated with either non-rotating or rotating applications.

Directing attention to FIGS. 1 and 2, the base member 87 of the clamping unit 85 has a longitudinal axis 95 extending therethrough. The laterally facing abutment surface 90 is lateral relative to the longitudinal axis 95 and outwardly facing on the base member 87.

The shank bore 80 intersects with and extends inwardly from the laterally facing abutment surface 90 for receiving the toolholder shank 45. Of interest in this particular design, the shank bore 80 has a shank bore axis 75 that is non-parallel to the base member longitudinal axis 95.

A lock rod 100 (FIG. 2) has a forward end 105 and a rearward end 107 within the base member 87. The lock rod 100 is movable along the base member longitudinal axis 95 in a forward (arrow 110) and rearward (arrow 115) reciprocating motion for securing the toolholder shank 45 within the bore 80 to a locked position (FIG. 4) and for releasing the toolholder shank 45 from the bore 80 to an unlocked position (FIG. 2). At least one springs 120 is biased to urge the lock rod 100 into the locked position.

In the embodiment illustrated in FIGS. 1 and 2, the shank bore axis 75 is perpendicular to the longitudinal axis 95 of the base member 87. To advance the toolholder 10 from the locked position illustrated in FIGS. 4 and 5 to the unlocked position illustrated in FIGS. 2 and 3, it is not only necessary to relieve the retention force exerted by locking balls 125, it is furthermore necessary to positively displace the toolholder 10 from the base member 87 to overcome what may be an interference fit between the shank 45 of the toolholder 10 and the shank bore 80 of the base member 87.

Therefore, the clamping device 85, furthermore includes a bump-off pin 130 slidable within the shank bore 80 along the shank axis 75. As illustrated in FIG. 2, the bump-off pin 130 has a ramp 135 and the lock rod 100 has a complementary ramp 140 oriented such that movement of the lock rod 100 in the rearward direction 115 forces the bump-off pin 130 radially outward against the toolholder core 142 to displace the toolholder shank 45 and, therefore, to displace the toolholder 10 from the shank bore 80.

As mentioned, the lock rod 100 reciprocates from the unlocked position (FIGS. 2 and 3) to the locked position (FIGS. 4 and 5). A positive displacement device 145 is utilized to move the lock rod 100 between these two positions. One positive device 145 used to reciprocate the lock rod 100 back and forth between the unlocked position (FIG. 2) and the locked position (FIG. 4) is the cam mechanism illustrated in FIGS. 2-4. In particular, the positive displacement device 145 is a cam 150 with a cam post 155 on a cam support base 160 mounted within the base member 87, wherein the rotation of the cam base 160 causes the cam post 155 to laterally displace the lock rod 100.

Figure 6:
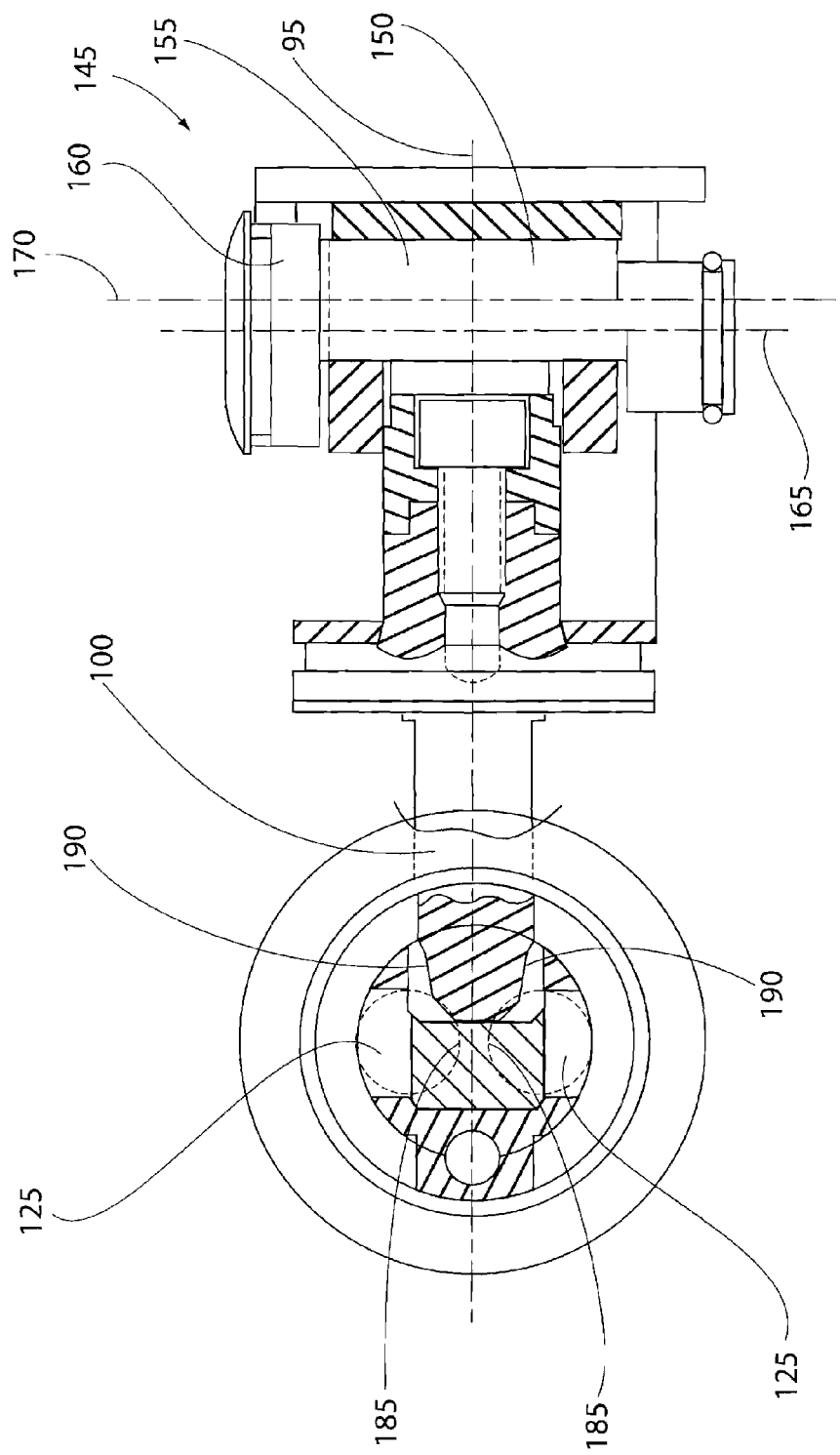
FIG. 6 is a sectional view along lines "6-6" in FIG. 1 illustrating the relative motion of the cam relative to the locking balls.
Figure 7:
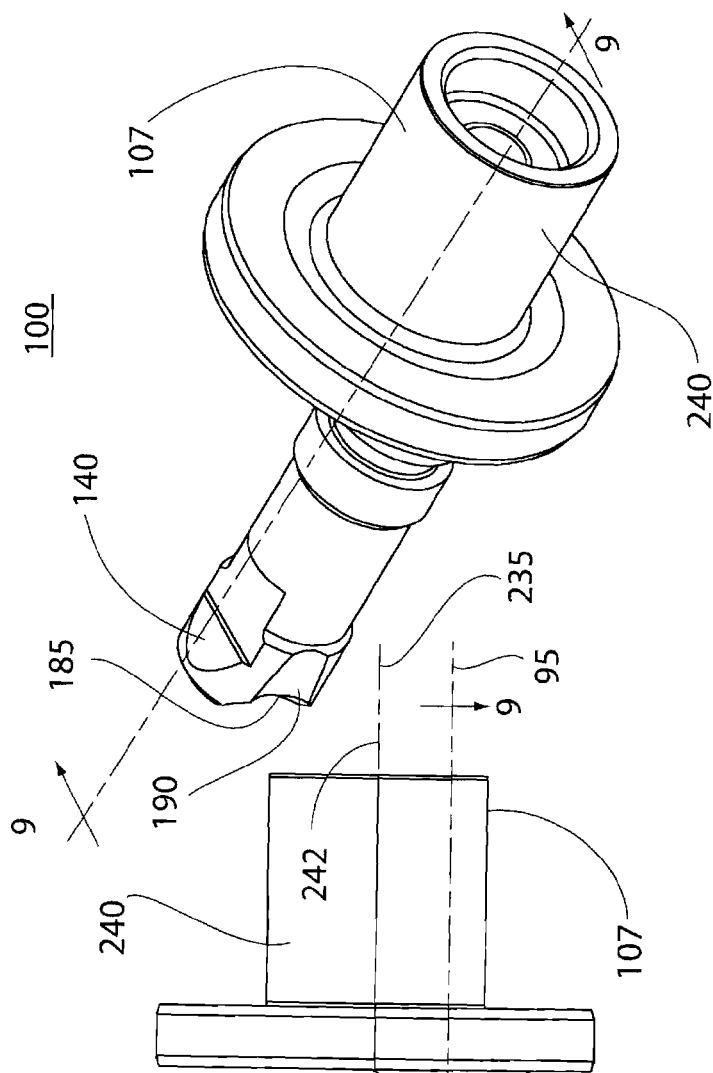
FIG. 7 is perspective view of the lock rod in accordance with the subject invention.
Figure 8:
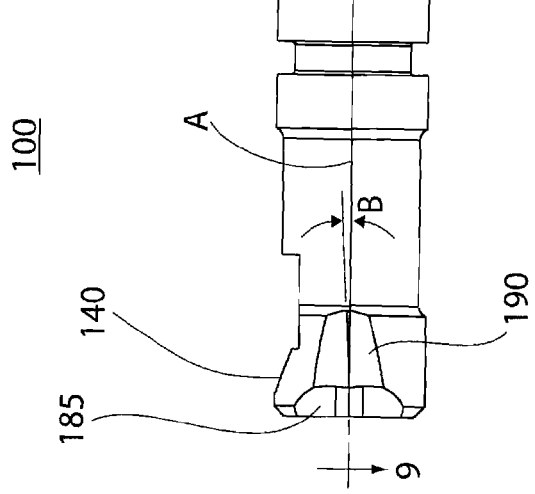
FIG. 8 is a side view of the lock rod in FIG. 7.
Figure 9:
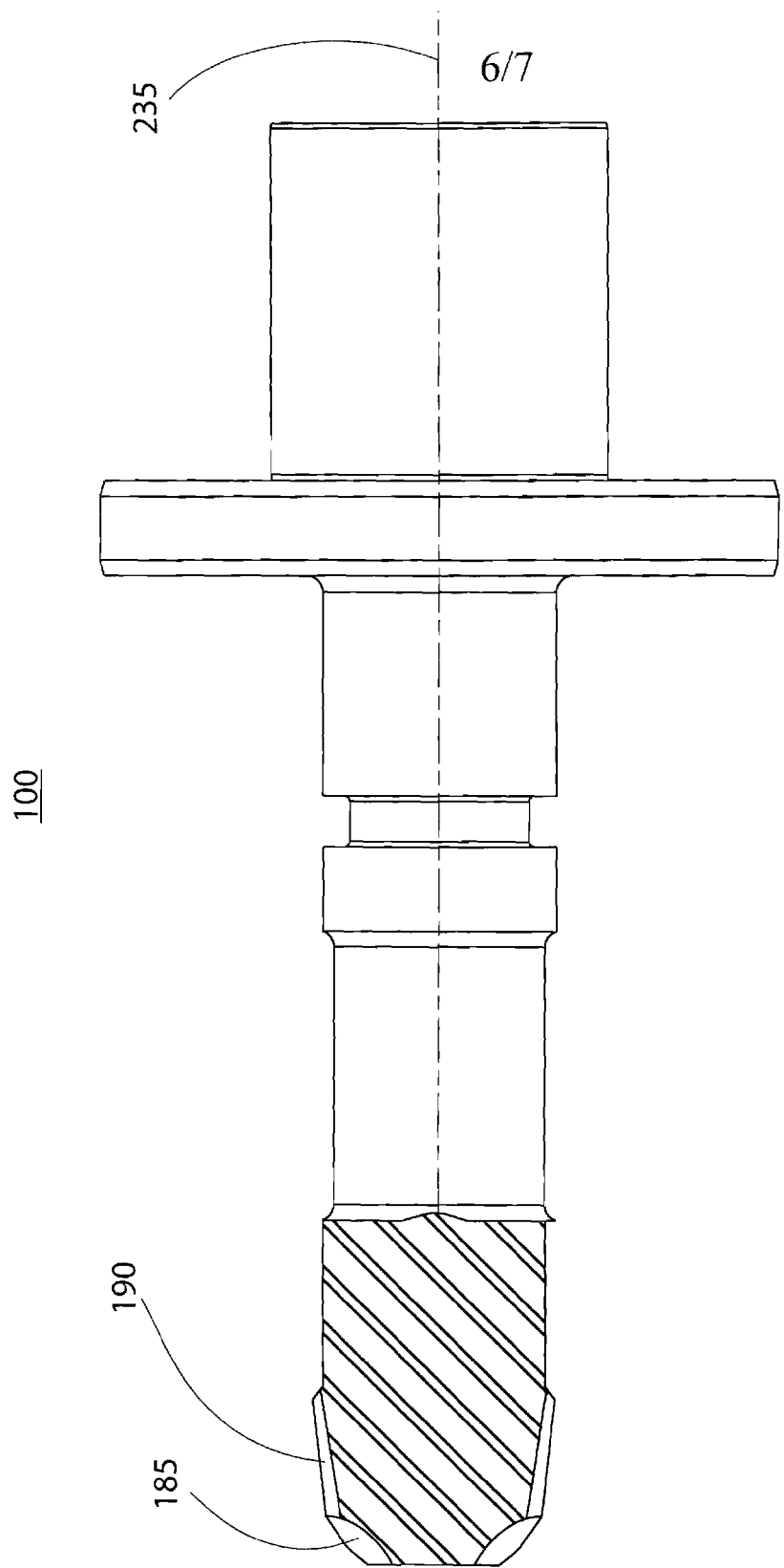
FIG. 9 is a sectional view along lines "9-9" in FIG. 7.

As illustrated in FIGS. 2, 4, and 6, the positive displacement device 145 is a cam 150, wherein the rotation of the cam 150 causes the cam post 155 to laterally displace the lock rod 100. The cam has a rotational axis 165 and the cam post 155 extending therefrom has a cam post centerline 170 offset from the cam base rotational axis 165. As illustrated, the cam base rotational axis 165 is perpendicular to the lock rod longitudinal axis 95.

Directing attention to FIGS. 2 and 3, a canister 175 is positioned within the shank bore 80 and includes opposing canister apertures 180 extending radially from the lock rod 100 and further including locking balls 125 movable within the apertures 180 to engage forwardly facing contact surfaces 60 of the perforations 55 of the toolholder shank 45.

Directing attention to FIGS. 6-9, the lock rod 100 has opposing depressions 185 to accommodate the locking balls 125 when the lock rod 100 is in the unlocked position (FIG. 6). Directing attention to FIG. 3, as the lock rod 100 moves forward, the locking balls 125 travel radially outward in the canister apertures 180 (FIG. 5) and are also displaced laterally relative to the lock rod centerline 95. As a result, in order for the locking balls 125 to track the true center of the locking ramps 190, the locking ramps 190 must be angled (FIG. 8) to compensate for this lateral displacement. Adjacent to each depression 185 is a locking ramp 190 extending along an axis A (FIG. 8) which forms an angle B with the lock rod longitudinal axis 95. The angle B may be approximately 5°. It is possible for the canister apertures 180 to extend in a purely radial direction from the shank centerline 70 and, under these circumstances, the angle B illustrated in FIG. 8 would be 0°.

Unlike prior art spring loaded lock rod mechanisms, wherein the toolholder is removable and insertable along an axis parallel to the longitudinal axis of the reciprocating lock rod, in the subject invention, the toolholder 10 is movable along an axis 75 which is non-parallel to the longitudinal axis 95 defining the direction of motion of the lock rod 100.

Directing attention to FIG. 3, the purpose of the canister wall 182, angled with respect to a line 195 extending radially from the shank bore 75, by angle Y, is to provide an increased mechanical advantage as the locking ball 125 is pushed radially outward against the canister wall 182 and against the forwardly facing contact surface 60 of the shank 45. In particular, the canister wall 182 is furthest from the forwardly facing contact surface 60 and together the canister wall 182 and the forwardly facing contact surface 60 define a wedging angle W for increasing the force of wedging and locking engagement between the locking element 125 and the wall 60 of the toolholder shank perforation 55. The locking ramps 190 of the lock rod 100 are angled relative to a line A parallel to the lock rod axis 95 at an angle B to permit the locking balls 125 to move axially and radially through the canister aperture 180 and to continue to track along the locking ramp 190. The wedging angle W may be between 2° to 10°.

Returning to FIGS. 2-5, the clamping device 85 is comprised of a base member 87 having the lock rod 100 moving reciprocally therein along the lock rod longitudinal axis 95. Attached to the lock rod 100 through the bolt 205 is a yoke 210 along with the yoke release plate 215 attached thereto. The lock rod 100, yoke 210, and yoke release plate 215 form a single part and move together. A cam follower 220 is a ring-like member surrounding the yoke 210 and free to move laterally relative to the yoke 210. This can be seen comparing FIG. 2 with FIG. 4. When the cam 150 is rotated, the cam post 155 is laterally displaced to the left where it engages the edge 225 of the cam follower 220, thereby pushing the cam follower 220 to the left. The cam follower 220 is able to slide along the lock rod 100. The springs 120 are biased against the cam follower 220 to the right. When the cam 150 is rotated from the unlocked position in FIG. 2 to the locked position in FIG. 4, the cam follower 220 is urged to the left by the cam post 155 contact with the edge 225 of the cam follower 220. The cam follower 220 then moves the springs 120 which move the lock rod 100, along with the yoke 210 and yoke release plate 215 to the left until the locking balls 125 (FIG. 5) engage the shank forwardly facing contact surface 60. At this point, additional movement of the cam follower 220 to the left will compress the springs 120 against the shoulder 230 of the lock rod 100 such that the axial force acting to move the lock rod 100 against the locking balls 125 is the force generated by the compression of the springs 120 caused by the motion to the left of the cam follower 225 against the resistance of the positioned locking balls 125.

Comparing FIGS. 3 and 5, as the lock rod 100 moves to the left, the locking balls 125 begin to move radially outward and engage the forwardly facing contact surfaces 60 of the perforations 55 of the shank 45. As mentioned, further rotation of the cam 150 causes the cam follower 220 to act against the springs 120 and to compress the springs 120 against the shoulder 230 of the lock rod 100. The cam 150 is intentionally designed to displace the cam follower only a certain amount so that the compression of the springs 120 is limited, thereby limiting to a maximum and predetermined amount the force the springs 120 applies to the lock rod 100, which in turn is the same force in the longitudinal direction 95 applied to the locking balls 125 as they expand radially against the forwardly facing contact surfaces 60 of the perforations 55 of the shank 45.

Directing attention to FIGS. 2, 7, 8, and 9, the lock rod 100 has a longitudinal axis 95. However, the rearward portion 107 of the lock rod 100 has a centerline 235 with a rear lock rod portion 240 that is offset from the centerline 95 of the lock rod 100. The purpose of this offset is to further minimize the footprint of the clamping device 85. As can be seen from FIG. 2, the area of the base member 87 in the region of the toolholder 10 may have a smaller width W1 than the remaining region, which must house the springs 120 and the cam 150. In particular, the lock rod rear portion 240 has a rear portion centerline 235 offset from the lock rod longitudinal axis 95 to permit the clamping device 85 to have a smaller volume.

Figures 10, 10A:
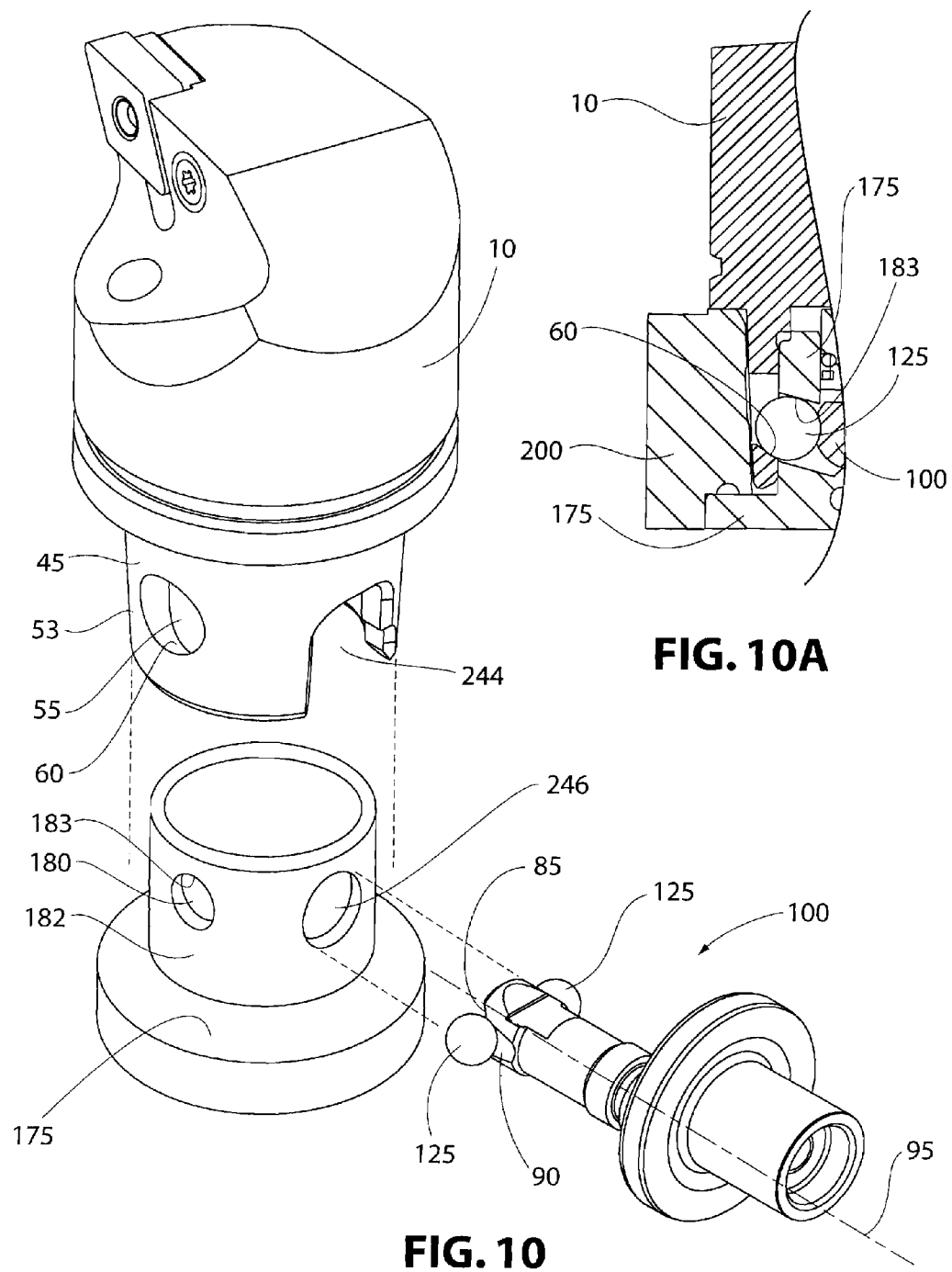
FIG. 10 is an exploded view illustrating the inter-relationship between the canister, the lock rod, the locking balls, and the toolholder.
FIG. 10A is a view of the canister, the lock rod, the locking balls, and the toolholder in an assembled state.

FIG. 10 illustrates an exploded view showing the interaction of the toolholder 10, canister 175, lock rod 100, and locking balls 125. In particular, the canister 175 has a bore 246 extending along the longitudinal axis 95 of the lock rod 100. As seen in FIG. 2, the lock rod 100 extends within the bore 246 to a distance such that the locking balls 125 may move within the apertures 180 of the canister wall 182. The locking balls 125 are moved radially outward through the canister aperture 180 by the locking ramps 90. As the locking balls 125 travel radially outward from the canister aperture 180, they engage the forwardly facing contact surface 60 of the perforations 55 within the shank wall 53 and the locking ball 125 becomes wedged between the forwardly facing contact surface 60 of the shank wall 53 and the rearwardly facing abutment surface 183 of the canister aperture 180. Although not illustrated in FIG. 10, it should be appreciated that the shank 45 of the toolholder 10 fits within the shank bore 80 of the base member 87 (FIG. 3). FIG. 10A shows the interrelationship of the toolholder 10, canister 175, lock rod 100, and locking ball 125 in the assembled state.

While what has been described so far is an arrangement whereby the lock rod 100 is movable toward the rearward end 107 to displace the toolholder 10 from the shank bore 80 and, wherein the lock rod 100 engages the toolholder 10 with motion toward the forward end 105 of the lock rod 100. With obvious modifications it is possible for these motions to be reversed. In particular, through obvious modifications of the ramps 135, 140 (FIG. 2) and with reversal of the depressions 185 and the locking ramps 190, illustrated in FIG. 8, it is possible for a lock rod 100 to be movable toward the forward end 105 to displace the toolholder 10 from the shank bore 80 and the lock rod 100 to engage the toolholder 10 with motion toward the rearward end 107 of the lock rod 100.

What has so far been discussed is the use of the cam 150 to reciprocate the lock rod 100 back and forth. The Applicants believe that one of the novel features of the subject invention is the arrangement by which the lock rod 100 moves along a longitudinal axis 95 to secure the toolholder 10 along a toolholder axis 70 non-parallel to the lock rod 100 longitudinal axis 95. To that end, the positive displacement device 145 for moving the lock rod 100 in its reciprocating motion may be mechanisms other than the cam 150 discussed herein. In particular, although not illustrated, the back end of the lock rod may be threaded and advanced back and forth through rotations of a nut on the threaded end of the lock rod. Additionally, other techniques for reciprocating a lock rod back and forth within a body are known to those skilled in the art of metal working clamping devices.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A clamping unit for releasably holding a tubular toolholder shank, comprising:
    a) a base member with
        1) a base member longitudinal axis extending therethrough;
        2) a laterally facing abutment surface; and
        3) a shank bore intersecting with and extending inwardly from the laterally facing surface for receiving the toolholder shank, wherein the shank bore has a shank bore axis that is non-parallel to the base member longitudinal axis;
    b) a lock rod with a forward end and a rearward end within the base member movable along the base member longitudinal axis in a forward and rearward reciprocating motion for securing the toolholder shank within the bore to a locked position and for releasing the toolholder shank from the bore to an unlocked position; and
    c) at least one spring biased to urge the lock rod into the locked position.

2. The clamping unit according to claim 1, wherein the shank bore axis is perpendicular to the longitudinal axis of the base member.

3. The clamping unit according to claim 1, further including a bump-off pin slidable within the bore and a ramp on one or both of the lock rod and the bump-off pin such that displacement of the lock rod forces the bump-off pin radially outward, wherein the overall displacement of the bump-off pin is sufficient to displace the toolholder shank, and the toolholder, from the shank bore.

4. The clamping unit according to claim 3, further including a positive displacement device that moves the lock rod against the spring force to the unlocked position to displace the toolholder from the shank bore.

5. The clamping unit according to claim 4, wherein positive displacement device is a cam mounted within the base member wherein rotation of the cam laterally displaces the lock rod.

6. The clamping unit according to claim 5, wherein the cam comprises a rotatably secured support base with a rotational axis and a cam post extending therefrom having a centerline offset from the rotational axis, wherein the centerline is perpendicular to the lock rod longitudinal axis.

7. The clamping unit according to claim 6, wherein the centerline is parallel to a plane formed by the intersection of the lock rod longitudinal axis and the toolholder longitudinal axis.

8. The clamping unit according to claim 4, wherein the positive displacement device is a nut which engages a threaded end of the lock rod to translate the lock rod.

9. The clamping unit according to claim 1, wherein the lock rod engages the toolholder with motion toward the forward end of the lock rod.

10. The clamping unit according to claim 9, wherein the lock rod is movable toward the rearward end to displace the toolholder from the shank bore.

11. The clamping unit according to claim 1, wherein the lock rod engages the toolholder with motion toward the rearward end of the lock rod.

12. The clamping unit according to claim 9, wherein the lock rod is movable toward the forward end to displace the toolholder from the shank bore.

13. The clamping unit according to claim 1, further including a lock rod extension having an extension longitudinal axis offset from the lock rod base longitudinal axis to permit the base member to have a smaller volume.

14. The clamping unit according to claim 1, wherein a canister is positioned within the shank bore and wherein the canister includes opposing canister apertures extending radially from the lock rod longitudinal axis and further including locking balls movable within the forwardly facing contact surfaces of the apertures to engage the toolholder shank.

15. The clamping unit according to claim 1, wherein the lock rod has opposing depressions to accommodate the locking balls when the lock rod is in the unlocked position and a locking ramp adjacent to the depression extending along an axis forming an angle with the lock rod longitudinal axis.

16. The clamping unit according to claim 15, wherein the depression axis forms an angle parallel to the lock rod longitudinal axis.

17. The clamping unit according to claim 15, wherein the depression axis forms an angle non-parallel to the lock rod longitudinal axis.

18. The clamping unit according to claim 17, wherein the angle is approximately 5 degrees.

19. A clamping unit for detachably connecting a toolholder to a base member comprised of:
a) a base member with:
1) a base member longitudinal axis extending therethrough;
2) a laterally facing abutment surface;
3) a shank bore intersecting with and extending inwardly from the laterally facing surface for receiving the toolholder shank, wherein the shank bore has a shank bore axis that is non-parallel to the base member longitudinal axis;
4) at least one locking ball;
5) a canister member that is mateable with a toolholder and which includes an aperture for admitting the locking ball; and
6) a lock rod that is reciprocally movable along a longitudinal axis and including a depression for receiving the locking element in an unlocked position and a ramp on one side of the depression for moving the locking element radially with respect to the axis through the canister aperture from an unlocked position into locking engagement with a wall of the toolholder.

20. The clamping unit according to claim 19,
a) wherein a side of the aperture of the canister member closest to the depression is elongated parallel to the longitudinal axis from a cylindrical shape of the locking ball to an elongated shape thereby defining at least one elongated side for allowing the locking ball to move axially within the aperture and axially along the depression as well as radially;
b) wherein the aperture includes a side opposite from the elongated side that is angled at a wedging angle with respect to a line projecting radially from the longitudinal axis for increasing the force of wedging and locking engagement between the locking element and the wall of the toolholder by increasing the mechanical advantage between the locking ball and the toolholder wall; and
c) wherein the depression in the lock rod extends along a depression axis and is angled relative to the lock rod axis to permit the locking ball to move axially and radially through the canister aperture and to track along the depression longitudinal axis.

21. The clamping unit according to claim 20, wherein the wedging angle is between 2°-10°.

* * * * *